(12) United States Patent
Kirzhner

(10) Patent No.: US 11,697,365 B2
(45) Date of Patent: Jul. 11, 2023

(54) SEAT ASSEMBLY

(71) Applicant: Lear Corporation, Southfield, MI (US)

(72) Inventor: Rochelle Kirzhner, Royal Oak, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 17/519,022

(22) Filed: Nov. 4, 2021

(65) Prior Publication Data

US 2023/0132930 A1 May 4, 2023

(51) Int. Cl.
*B60R 7/04* (2006.01)
*B60N 2/64* (2006.01)

(52) U.S. Cl.
CPC .............. *B60N 2/643* (2013.01); *B60R 7/043* (2013.01)

(58) Field of Classification Search
CPC ...................................................... B60R 7/043
See application file for complete search history.

(56) References Cited

U.S. PATENT DOCUMENTS

| | | | |
|---|---|---|---|
| 2,294,039 A | 8/1942 | Looney | |
| 5,292,174 A * | 3/1994 | Ohnuma | B60R 7/043 297/188.06 |
| 5,356,061 A * | 10/1994 | Yu | B60R 7/043 297/188.2 |
| 5,863,092 A * | 1/1999 | Kifer | B60R 7/043 211/12 |
| 6,059,358 A | 5/2000 | Demick et al. | |
| 6,131,993 A * | 10/2000 | Pesta | B60R 7/12 297/452.38 |
| 6,135,332 A * | 10/2000 | Eleam | B60R 7/043 224/42.32 |
| 6,375,399 B1 * | 4/2002 | Sitzler | B60R 7/043 410/80 |
| 10,414,343 B2 * | 9/2019 | Shrewsbury | B60R 7/043 |
| 2006/0075759 A1 | 4/2006 | Krieger et al. | |
| 2013/0105533 A1 | 5/2013 | Orduno | |
| 2019/0217784 A1 * | 7/2019 | Vanderpool | B60R 7/043 |
| 2021/0053500 A1 * | 2/2021 | Busse | B60R 7/043 |

(Continued)

FOREIGN PATENT DOCUMENTS

| | | | | |
|---|---|---|---|---|
| DE | 102014212091 A1 | 12/2015 | | |
| DE | 202019103067 U1 * | 7/2019 | ............... | B60N 3/00 |
| DE | 102020133054 A1 * | 6/2021 | ............... | B60R 7/08 |

(Continued)

OTHER PUBLICATIONS

Designs available to the public at least as early as Nov. 3, 2020.

(Continued)

*Primary Examiner* — Timothy J Brindley
(74) *Attorney, Agent, or Firm* — Fishman Stewart PLLC

(57) ABSTRACT

A seat assembly may include a seat base and/or a seat back. The seat back may be connected to the seat base. The seat back may include a back panel having a plurality of external support members disposed in a grid configuration. The back panel may include a first portion, a second portion, and/or a third portion. The third portion may connect the second portion to the first portion. A method of assembling a seat assembly may include connecting the back panel with the seat back, and/or connecting the seat back to the seat base.

20 Claims, 6 Drawing Sheets

(56) References Cited

U.S. PATENT DOCUMENTS

2022/0032848 A1* 2/2022 Myers .................... A45C 11/24

FOREIGN PATENT DOCUMENTS

| EP | 1366951 | A2 |   | 12/2003 |         |           |
|----|---------|----|---|---------|---------|-----------|
| FR | 2919829 | A1 | * | 2/2009  | ........ | B60N 2/206 |
| FR | 2990392 | A1 | * | 11/2013 | ........ | B60N 2/4221 |

OTHER PUBLICATIONS

Grey Man Tactical: Vehicle Seat Back Organizer, https://greymantactical.com/products/vehicleseatbackorganizer1525x25rmp?variant=31851221057635, accessed May 11, 2021.

* cited by examiner

SEAT ASSEMBLY

TECHNICAL FIELD

The present disclosure generally relates to seat assemblies, including seat assemblies that may be configured to support one or more external objects.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some seat assemblies do not provide sufficient functionality, are not configured to support one or more external objects, and/or require complicated assembly processes.

There is a desire for solutions/options that minimize or eliminate one or more challenges or shortcomings of seat assemblies. The foregoing discussion is intended only to illustrate examples of the present field and is not a disavowal of scope.

SUMMARY

In embodiments, a seat assembly may include a seat base and/or a seat back. The seat back may be connected to the seat base. The seat back may include a back panel having a plurality of external support members disposed in a grid configuration. The back panel may include a first portion, a second portion, and/or a third portion. The third portion may connect the second portion to the first portion.

With embodiments, a method of assembling a seat assembly may include connecting the back panel with the seat back, and/or connecting the seat back to the seat base.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments of the present disclosure, examples of which are described herein and illustrated in the accompanying drawings. While the present disclosure will be described in conjunction with embodiments and/or examples, they do not limit the present disclosure to these embodiments and/or examples. On the contrary, the present disclosure covers alternatives, modifications, and equivalents.

Figure 1:
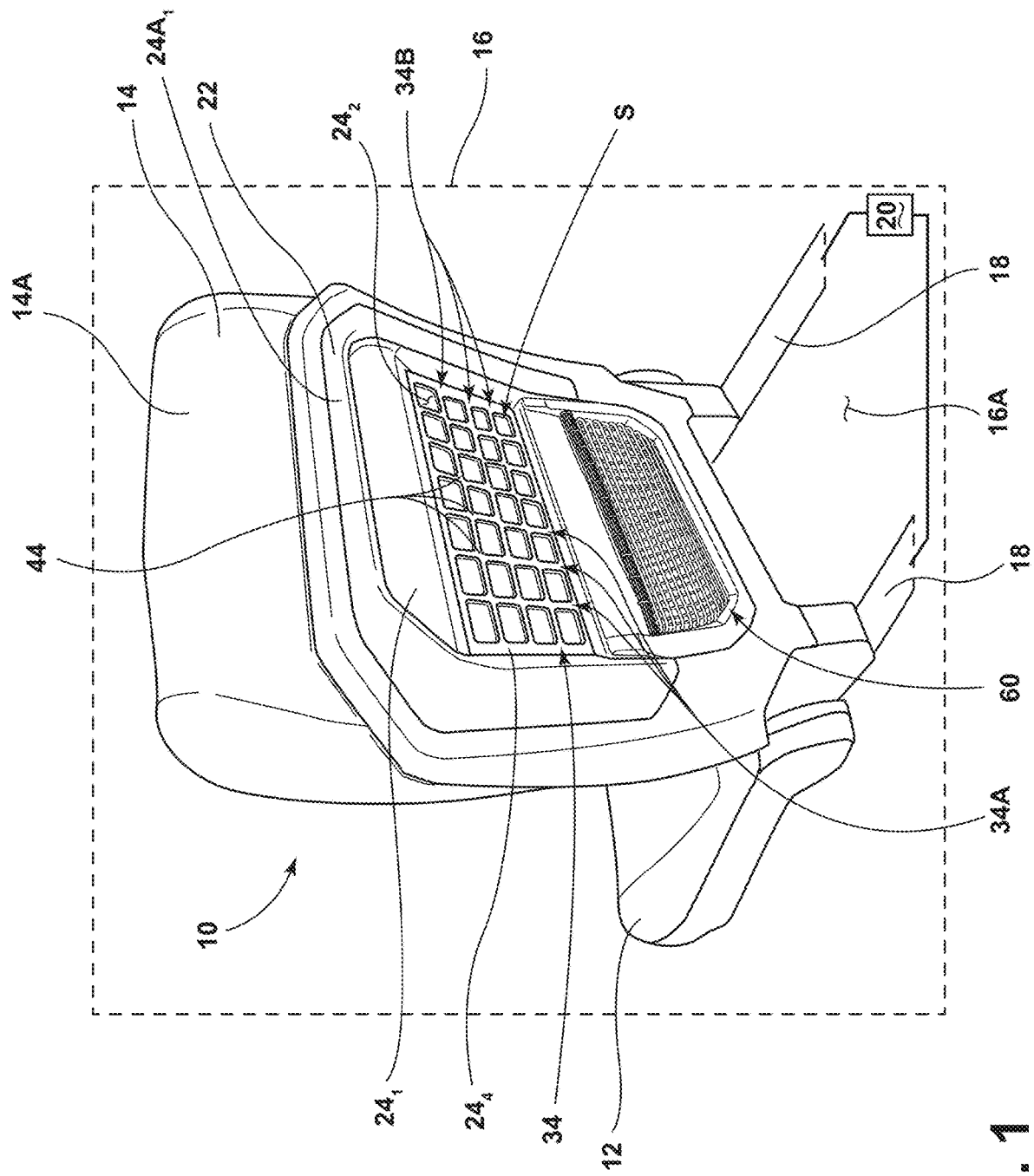
FIG. 1 is a perspective view generally illustrating an embodiment of a seat assembly.

In embodiments, such as generally illustrated in FIG. 1, a seat assembly 10 may include a seat base 12 and/or a seat back 14. The seat back 14 may be connected to the seat base 12. For example and without limitation, the seat back 14 may be pivotally connected to the seat base 12 such that the seat base and the seat back 14 may pivot/rotate relative to each other to a variety of seat positions. The seat base 12 and the seat back 14 may include one or more of a variety of shapes, sizes, materials, and/or configurations.

With some embodiments, a seat assembly 10 may be disposed within a vehicle 16. For example and without limitation, a seat base 12 may be selectively connected to a surface 16A, such as a surface (e.g., a floor) of a vehicle 16. In some example configurations, the seat base 12 may be selectively connected (e.g., electrically and/or mechanically) to a track assembly 18. The track assembly 18 may be electrically connected to an electronic control unit (ECU) 20. The seat assembly 10 may be electrically connected to the ECU 20, such as via the track assembly 18. The ECU 20 may be configured to at least partially control operation of the seat assembly 10 (e.g., rotation of the seat back 14, movement along the track assembly 18, etc.).

In embodiments, a vehicle 16 may include one or more of a variety of configurations. For example and without limitation, a vehicle 16 may include a land vehicle, a passenger car, a van, a sport utility vehicle (SUV), a crossover, a truck (e.g., a pickup truck, a commercial truck, etc.), a bus, a watercraft, an aircraft (e.g., a plane, a helicopter, etc.), and/or a combination thereof (e.g., a vehicle for land and water, a vehicle for air, land, and water, etc.), among others.

Figure 2:
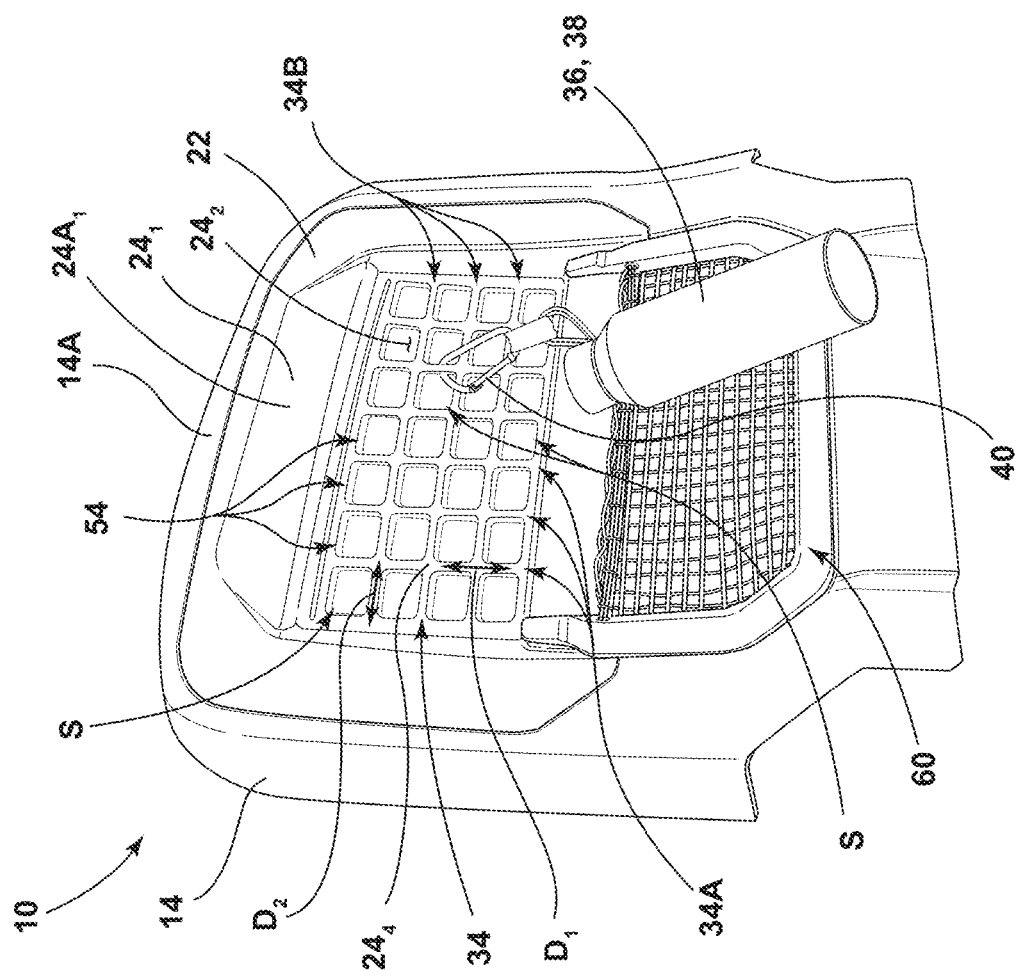
FIG. 2 is a perspective view generally illustrating a portion of an embodiment of a seat assembly.

With embodiments, such as generally illustrated in FIGS. 1 and 2, a seat back 14 may include a back panel 22. The back panel 22 may be connected (e.g., fixed) to the seat back 14 via fasteners, snap fittings, clips, and/or hooks, among others. The back panel 22 may be disposed at a rear side 14A of the seat back 14. The back panel 22 may be accessible (e.g., reachable) by a passenger and/or an operator of a vehicle 16. The back panel 22 may include one or more of a variety of shapes, sizes, materials, and/or configurations.

Figure 3:
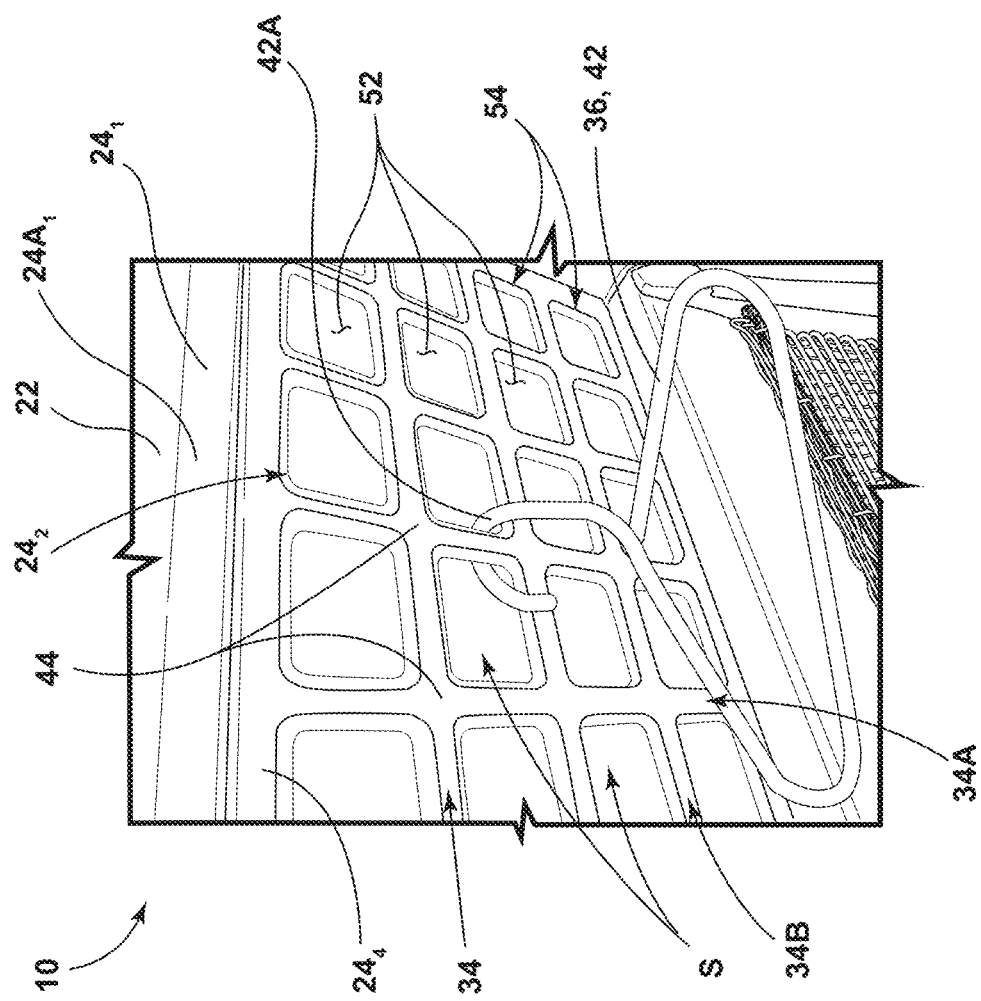
FIG. 3 is a partial perspective view generally illustrating an embodiment of a seat assembly.
Figure 4:
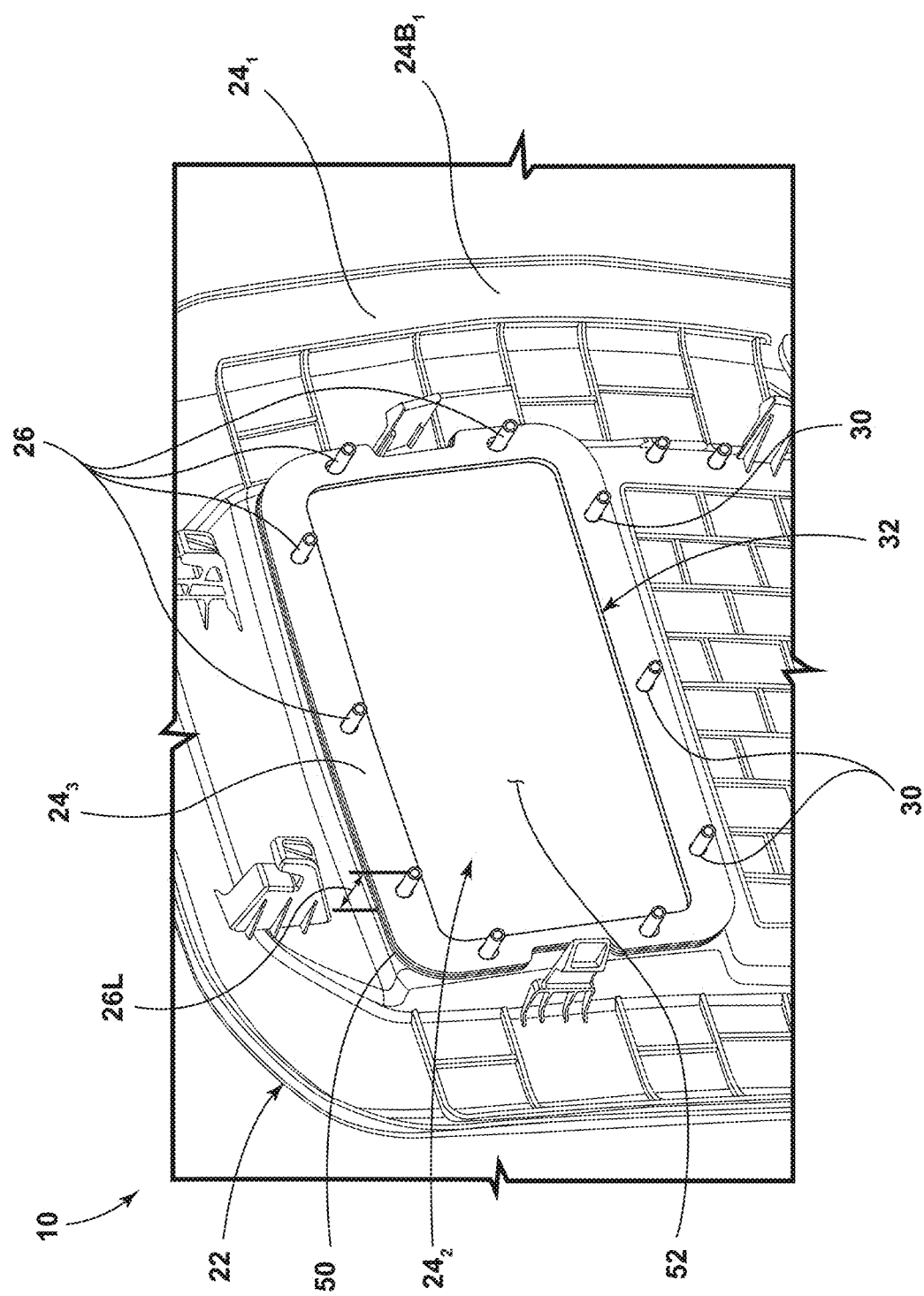
FIG. 4 is a partial perspective view generally illustrating an embodiment of a seat assembly.
Figure 5:
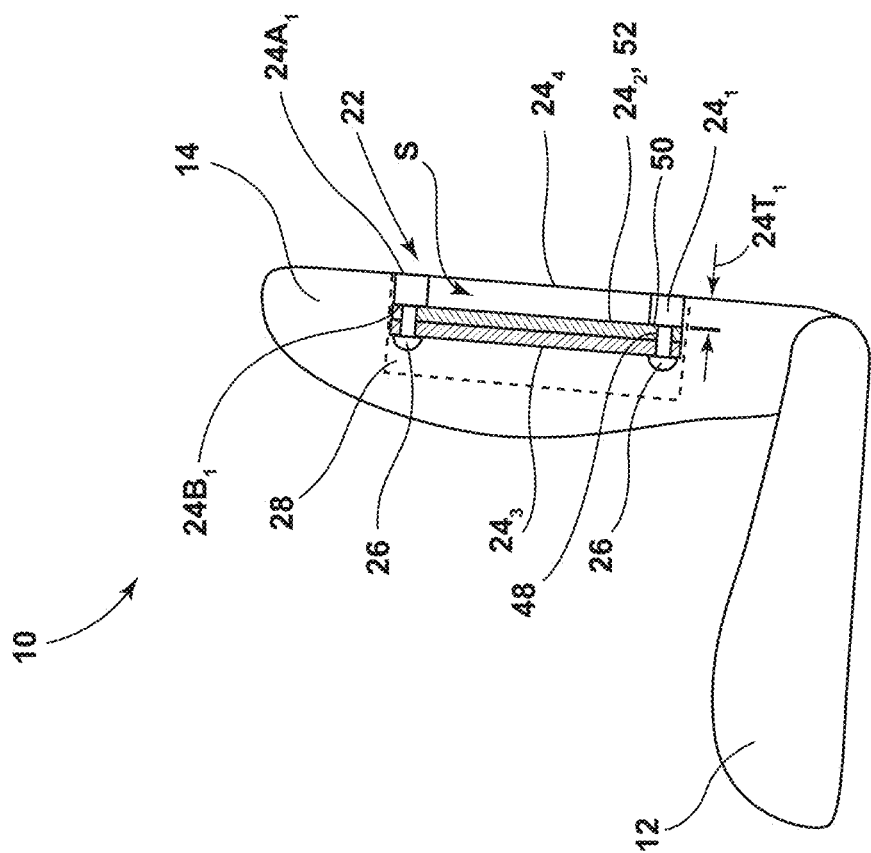
FIG. 5 is a cross-sectional view generally illustrating an embodiment of a seat assembly.

In embodiments, such as generally illustrated in FIGS. 3, 4, and 5, a back panel 22 may include a plurality of portions, such as a first portion $24_1$, a second portion $24_2$, a third portion $24_3$, and/or a fourth portion $24_4$. The first portion $24_1$ may include a first/outer side $24A_1$ (see, e.g., FIG. 3) and/or a second/inner side $24B_1$ (see, e.g., FIG. 4). The second side $24B_1$ may face inward toward internal portions 28 of the seat back 14 (see, e.g., FIG. 5). At least some portions of the second side $24B_1$ may engage at least some portions of the seat back 14. The first side $24A_1$ may be configured as an outer/external surface of the seat back 14 that may be visible when assembly is complete (see, e.g., FIGS. 1 and 2).

With embodiments, a first portion $24_1$ of a back panel 22 may include a plurality of protrusions 26. The protrusions 26 may extend from a second side $24B_1$ of the first portion $24_1$ (see, e.g., FIGS. 4 and 5). The protrusions 26 may include one or more of a variety of shapes, sizes, and/or configurations. For example and without limitation, the protrusions 26 may include cylindrical configurations that may or may not include approximately an equal length 26L. The protrusions 26 may be disposed in a configuration that may correspond to the shape of the fourth portion $24_4$. For example and without limitation, the protrusions 26 may be disposed in a generally rectangular and/or square configuration (see, e.g., FIG. 4). The protrusions 26 may or may not be arranged approximately evenly spaced apart from one another. The protrusions 26 may be configured to undergo a heat staking process, such as to connect (e.g., fix) the first portion $24_1$, a second portion $24_2$, a third portion $24_3$, and/or a fourth portion $24_4$ together (e.g., the protrusions 26 may include and/or be configured as heat stakes).

In embodiments, a first portion $24_1$ of a back panel 22 and/or a plurality of protrusions 26 may comprise a plastic material. For example and without limitation, the first portion $24_1$ and/or the plurality of protrusions 26 may comprise one or more of polycarbonate (PC), polypropylene (PP), polystyrene (PS), acrylonitrile butadiene styrene (ABS), nylons (GFN, Nylon 6/6, etc.), and/or polyetherimide (PEI), among others.

With embodiments, such as generally illustrated in FIG. 5, a second portion $24_2$ of a back panel 22 may be disposed at least partially between a first portion $24_1$ and a third portion $24_3$. The second portion $24_2$ may be configured to hide/cover internal portions 28 of a seat back 14, such as portions that might otherwise be at least partially visible through a fourth portion $24_4$ and/or apertures 54 thereof (see, e.g., FIG. 3). For example, the second portion $24_2$ may prevent the internal portions 28 from being seen/viewable from the outside of the seat assembly 10. The second portion $24_2$ may include one or more of a variety of shapes, sizes, and/or configurations. For example and without limitation, the second portion $24_2$ may have a shape that corresponds to the shape of the fourth portion $24_4$ and/or to the configuration of the protrusions 26, such as rectangular with rounded corners, among other possible shapes (see, e.g., FIG. 4). In some configurations, the second portion $24_2$ may, for example, comprise a fabric, such as vinyl (e.g., HBP vinyl, perforated vinyl, etc.), among other materials. The second portion $24_2$ may include one or more holes 48 (see, e.g., FIG. 5) that may be configured to receive one or more corresponding protrusions 26. The second portion $24_2$ may include a first section 50 that may, in an assembled configuration, be disposed between the first portion $24_1$ and the third portion $24_3$. The second portion $24_2$ may include a second section 52 that may be surrounded, at least in part, by the first section 50 (see, e.g., FIG. 4). An outer surface of the second section 52 may be visible through apertures 54 of the fourth portion $24_4$ (see, e.g., FIG. 3), and/or an inner surface of the second section 52 may not be covered by the third portion $24_3$. The second section 52 may be configured to flex, move, and/or deform, at least in some configurations. In some configurations, the second section 52 may be larger (e.g., include a greater surface area and/or volume) than the first section 50. The second section 52 may or may not be elastic.

In embodiments, such as generally illustrated in FIG. 4, a third portion $24_3$ of a back panel 22 may include a plurality of holes 30 and/or an opening 32 (e.g., a central opening). The plurality of holes 30 may be disposed adjacent to and/or about a perimeter of the third portion $24_3$. The plurality of holes 30 may be aligned with and/or include a similar arrangement as a plurality of protrusions 26 of a first portion $24_1$. For example, in an assembled configuration, one or more protrusions 26 may be at least partially disposed in one or more corresponding holes 30. In some example configurations, the third portion $24_3$ may be configured to connect (e.g., fix) the second portion $24_2$ to the first portion $24_1$ and/or the fourth portion $24_4$.

With embodiments, an opening 32 of a third portion $24_3$ may include one or more of a variety of shapes, sizes, and/or configurations. For example and without limitation, the shape of the opening 32 may correspond to and/or be smaller the shape of the third portion $24_3$ (e.g., may include a rectangular shape with rounded corners), such as to provide the third portion $24_3$ with a frame configuration. A substantial portion (e.g., a majority) of a second side $24B_2$ of second portion $24_2$ (e.g., second section 52) of a back panel 22 may be exposed and/or not covered by the third portion $24_3$. For example and without limitation, the opening 32 may allow the second section 52 of the second portion $24_2$ to move and/or deform inward into and/or beyond the third portion $24_3$ (e.g., if the second section 52 is flexible and/or not completely taut), such as to facilitate connecting an external object 36.

In embodiments, a third portion $24_3$ of a back panel 22 may comprise a plastic material. In some example configurations, the third portion $24_3$ may comprise one or more of polycarbonate (PC), polypropylene (PP), polystyrene (PS), acrylonitrile butadiene styrene (ABS), nylons (GFN, Nylon 6/6, etc.), and/or polyetherimide (PEI), among others. The third portion $24_3$ may include a material that is compatible with (e.g., has a high enough melt point for) heat staking of the protrusions 26.

With embodiments, such as generally illustrated in FIGS. 1, 2, and 3, a fourth portion $24_4$ of a back panel 22 may include a plurality of support members 34 (e.g., external support members). The plurality of support members 34 may be configured to support one or more external objects 36. The external objects 36 may include one or more of a variety of shapes, sizes, materials, and/or configurations. For example and without limitation, an external object 36 may include a beverage bottle 38 that may be detachably connected to one or more support members 34 via a clip 40 (see, e.g., FIG. 2), a clothing hanger 42 that may be detachably connected to the one or more support members 34 via a hook portion 42A of the clothing hanger 42 (see, e.g., FIG. 3), tools, and/or electronics, among others. In some configurations, the support members 34 may be substantially rigid. For example and without limitation, the support member 34 may be configured not to substantially deform, deflect, and/or flex when external objects 36 are connected (e.g., may not be elastic), at least for external objects 36 up to a certain weight (e.g., about 10 pounds, or more or less).

In embodiments, a plurality of support members 34 may include one or more of a variety of shapes, sizes, and/or configurations. For example and without limitation, a plurality of support members 34 may be disposed in a grid configuration/pattern (e.g., a plurality of support members 34 disposed in an intersecting and/or connected configuration) that may define one or more apertures 54. A support member 34 may, for example and without limitation, include a rectangular or trapezoidal cross-section, among other shapes. The plurality of support members 34 may include a plurality of first support members 34A and/or a plurality of second support members 34B. The plurality of first support members 34A may extend in a first direction $D_1$ (e.g., vertical direction) and/or the plurality of second support members 34B may extend in a second direction $D_2$ (e.g., horizontal direction) that may be orthogonal/perpendicular to the first direction $D_1$ (see, e.g., FIG. 2). The plurality of first support members 34A may intersect with the plurality of second support members 34B at a plurality of intersections 44. While a rectangular grid configuration of support members 34 (e.g., with vertical and horizontal support members 34) is shown for illustrative purposes, other grid configurations (e.g., diamonds, triangles, trapezoids, rounded, circular, irregular shapes, etc.) may be used instead of or in addition to a rectangular configuration. A grid configuration may facilitate/allow for connection of a plurality of external objects 36 to different portions (e.g., different support members 34) of the fourth portion $24_4$. The support members 34 may be integrally formed with each other.

With embodiments, such as generally illustrated in FIG. 5, a fourth portion $24_4$ and/or a plurality of support members 34 may be at least partially spaced apart from a second portion $24_2$ of a back panel 22 such that a space S is provided therebetween. The space S may, for example, be within the seat back 14. A size of the space S may be determined at least in part via a thickness $24T_1$ of the first portion $24_1$ and/or an offset of the protrusion(s) 26 of the first portion $24_1$ (e.g., distance between a second side $24B_1$ of first portion $24_1$ and the fourth portion $24_4$). Portions (e.g., clips, straps, hooks, strings, ropes, etc.) of one or more external objects 36 and/or fingers of a user may fit at least partially into the space S (e.g., via one or more apertures 54) to facilitate detachably connecting the one or more external objects 36 to the seat assembly 10. In an example where an external object 36 includes a beverage bottle 38 (see, e.g., FIG. 2) or other object with a clip 40, at least a portion of the clip 40 may be disposed within the space S and/or at least a portion of the clip 40 may be disposed partially or entirely around at least one of the plurality of support members 34. In an example where an external object 36 includes a clothing hanger 42 (see, e.g., FIG. 3) or other object with a clip or hook, at least a portion of a hook portion 42A of the clothing hanger 42 may be disposed within the space S and/or at least a portion of the hook portion 42A may be disposed around at least one of the plurality of support members 34. The plurality of support members 34 may at least in part support a weight of the one or more external objects 36 (e.g., beverage bottle 38 and/or clothing hanger 42, etc.).

In embodiments, a fourth portion $24_4$ of a back panel 22 may include one or more of a variety of materials. For example and without limitation, the fourth portion $24_4$ may include polycarbonate (PC), polypropylene (PP), polystyrene (PS), acrylonitrile butadiene styrene (ABS), nylons (GFN, Nylon 6/6, etc.), and/or polyetherimide (PEI), among others. In some configurations, the fourth portion $24_4$ may comprise the same material as the first portion $24_1$ and/or may be integrally formed with the first portion $24_1$.

With embodiments, such as generally illustrated in FIG. 5, a first portion $24_1$ (e.g., distal ends one or more protrusions 26) may be an innermost portion of a back panel 22, although a back panel 22 may include portions that extend farther inward. A fourth portion $24_4$ may be configured as an external surface of the back panel 22. For example and without limitation, the first portion $24_1$ and the fourth portion $24_4$ may cooperate to provide the external surface of the back panel 22 (e.g., the support members 34 may be disposed at and/or function as an outer/external surface of the back panel 22). In some example configurations, the fourth portion $24_4$ may be formed with the first portion $24_1$. For example and without limitation, the first portion $24_1$ and the fourth portion $24_4$ may be integrally formed as a single, unitary, and monolithic component. The first portion $24_1$, a third portion $24_3$, and/or the fourth portion $24_4$ may comprise one or more plastic materials. In some example configurations, the first portion $24_1$, the third portion $24_3$, and/or the fourth portion $24_4$ may comprise the same plastic material. In other example configurations, the first portion $24_1$, the third portion $24_3$, and/or the fourth portion $24_4$ may comprise one or more different materials (e.g., plastics). For example and without limitation, the second portion $24_2$ and/or the third portion $24_3$ may, at least initially, be formed as separate components from and/or comprise different materials than the first portion $24_1$ and/or the fourth portion $24_4$.

In some configurations, a net pocket and/or map pocket 60 may be included with and/or connected to the back panel 22 (see, e.g., FIG. 2).

Figure 6:
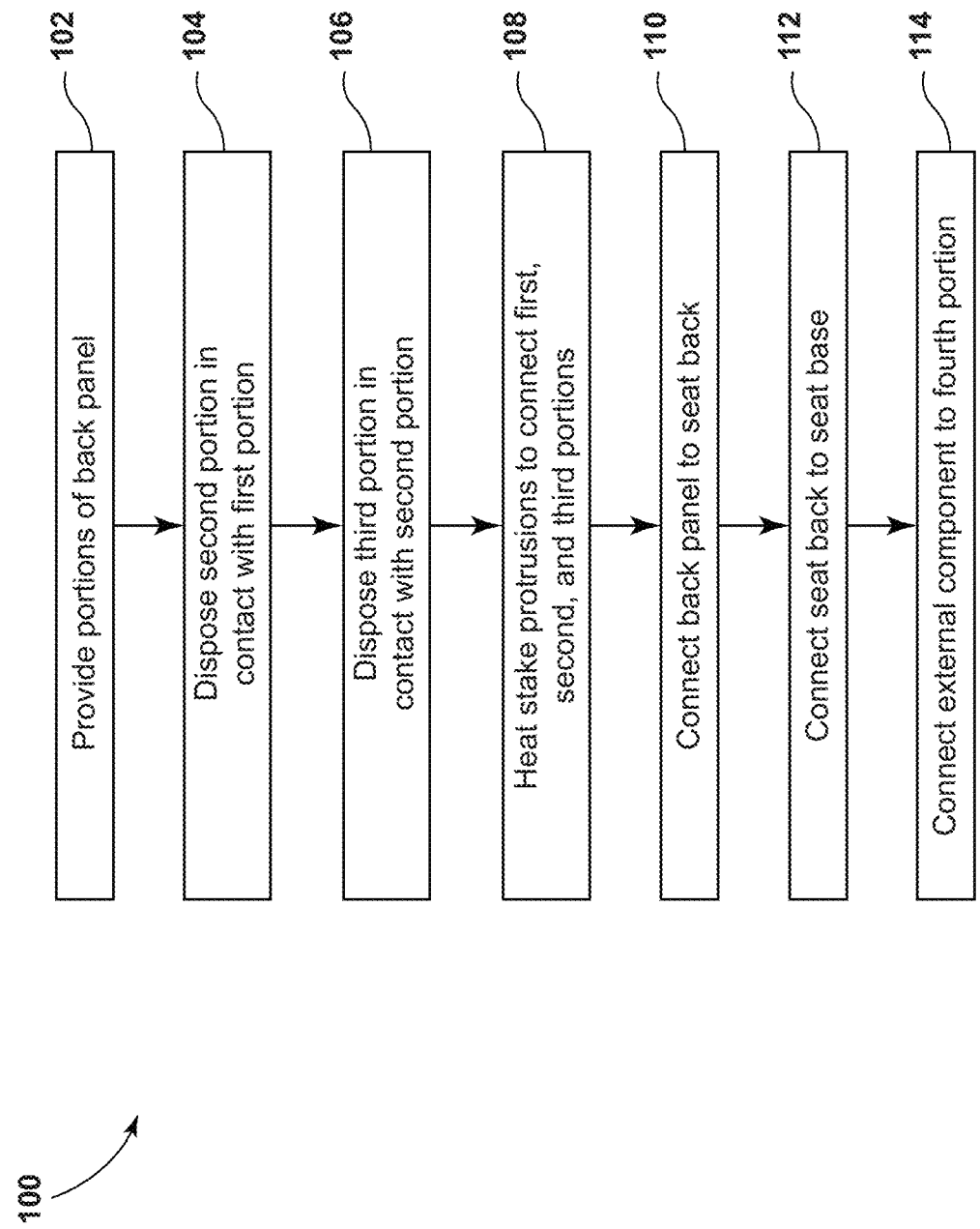
FIG. 6 is a flow diagram generally illustrating an embodiment of a method of assembling a seat assembly.

In embodiments, such as generally illustrated in FIG. 6, a method 100 of assembling a seat assembly 10 may include providing a first portion $24_1$, a second portion $24_2$, a third portion $24_3$, and/or a fourth portion $24_4$ of a back panel 22 (block 102). Providing a first portion $24_1$ may include forming a plurality of protrusions 26. Providing a third portion $24_3$ of the back panel 22 may include forming the third portion $24_3$ with a plurality of holes 30 and/or an opening 32. The holes 30 may be disposed about a perimeter of the third portion $24_3$ and/or may align with the protrusions 26 of the first portion $24_1$. Providing a fourth portion $24_4$ of the back panel 22 may include forming a plurality of support members 34 disposed in a grid configuration. The support members 34 may be configured to support one or more external objects 36. In some configurations, the fourth portion $24_4$ may be formed with the first portion $24_1$.

With embodiments, the method 100 may include disposing a second portion $24_2$ of the back panel 22 in contact with the first portion $24_1$ (block 104), such as with a second side $24B_1$ of the first portion $24_1$. Disposing the second portion $24_2$ in contact with the first portion $24_1$ may include inserting one or more protrusions 26 of the first portion $24_1$ into one or more respective holes 48 of the second portion $24_2$. Disposing the second portion $24_2$ of the back panel 22 in contact with the first portion $24_1$ may include disposing the second portion $24_2$ at a distance from the fourth portion $24_4$ such that a space S is provided between the second portion $24_2$ and the fourth portion $24_4$. Portions (e.g., clips, straps, hooks, etc.) of one or more external objects 36 may fit at least partially within the space S to facilitate detachably connecting the one or more external objects 36 to the seat assembly 10. In some configurations, the second portion $24_2$ may not be completely taut and/or may be configured to move. For example, in some instances, the second portion $24_2$ may be in contact with the fourth portion $24_4$ (e.g., one or more support members 34), but may be configured to move/deflect to provide a space S. In other configurations, the second portion $24_2$ may be configured not to contact the fourth portion $24_4$ (e.g., support member 34) such that a space S may be present without moving the second portion $24_2$. The second portion $24_2$ (e.g., the second section 52) may be configured to cover internal portions 28 of the seat assembly 10 that may otherwise be visible, such as via apertures 54 of the fourth portion $24_4$.

In embodiments, the method 100 may include disposing the third portion $24_3$ in contact with the second portion $24_2$ (block 106), such as with an inner side/surface of the second portion $24_2$. Disposing the third portion $24_3$ in contact with the second portion $24_2$ may include inserting one or more protrusions 26 of the first portion $24_1$ into one or more respective holes 30 of the third portion $24_3$. Disposing the third portion $24_3$ in contact with the second portion $24_2$ may include disposing at least some of the second portion $24_2$ (e.g., the first section 50) between the first portion $24_1$ and the third portion $24_3$.

With embodiments, the method 100 may include heat staking one or more protrusions 26 of the first portion $24_1$ to the third portion $24_3$ (block 108), such as to connect the first portion $24_1$, the second portion $24_2$, the third portion $24_3$, and/or the fourth portion $24_4$ (e.g., via the first portion $24_1$). In some example configurations, the first portion $24_1$, the third portion $24_3$, and/or the fourth portion $24_4$ may comprise one or more plastic materials, and/or the second portion $24_2$ may comprise a fabric material, such as vinyl. Heating staking the protrusions 26 may involve heating and/or melting the protrusions 26 onto the third portion $24_3$ such that the second portion $24_2$ is at least partially sandwiched (e.g., secured) between the first portion $24_1$ and the third portion $24_3$. For example and without limitation, the first section 50 of the second portion $24_2$ may be sandwiched/fixed between the first portion $24_1$ and the third portion $24_3$. Heat staking the protrusion(s) 26 with the third portion $24_3$, such as instead of directly with the second portion $24_2$, may limit and/or prevent the second portion $24_2$ from undergoing certain damage (e.g., heat damage, etc.) that may otherwise occur during the process of joining the first portion $24_1$, the second portion $24_2$, and/or the third portion $24_3$. For example and without limitation, a material of the second portion $24_2$ may not be compatible with heat staking, a material of the third portion $24_3$ may be compatible with heat staking, and/or the third portion $24_3$ may protect and/or insulate the second portion $24_2$ during heat staking. In some configurations, the melting point of the third portion $24_3$ may be higher than the first portion $24_1$, the second portion $24_2$, and/or the fourth portion $24_4$.

In embodiments, the method 100 may include connecting the back panel 22 with a seat back 14 (block 110). The back panel 22 may be connected (e.g., fixed) to the seat back 14 via fasteners, snap fittings, clips, and/or hooks, among others. In some example configurations, the second portion $24_2$ may be configured to hide/cover internal portions 28 of the seat back 14 and/or prevent the internal portion 28 from being viewable from the outside of the seat assembly 10.

With embodiments, the method 100 may include connecting the seat back 14 to a seat base 12 (block 112). In some embodiments, the method 100 may include connecting an external object 36 to the fourth portion $24_4$ (block 114). Connecting an external object 36 to the fourth portion $24_4$ may include inserting a portion of the external object 36 into an aperture 54 of the fourth portion $24_4$ and/or hooking a portion of the external object 36 on a support member 34 of the fourth portion $24_4$.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. Uses of "e.g." and "such as" in the specification are to be construed broadly and are used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

What is claimed is:
1. A seat assembly, comprising:
a seat base; and a seat back connected to the seat base, the seat back including a back panel having a plurality of external support members disposed in a grid configuration;

wherein the back panel includes a first portion, a second portion, and a third portion;

the third portion connects the second portion to the first portion;

the first portion includes a plurality of protrusions that extend toward an interior of the seat back;

the third portion includes a central opening and a plurality of holes that are disposed about a perimeter of the third portion;

the plurality of protrusions are disposed in respective holes of the plurality of holes;

a first section of the second portion is disposed between the first portion and the third portion;

a second section of the second portion is not disposed between the first portion and the third portion; and the second section is larger than the first section.

2. The seat assembly of claim 1, wherein the plurality of protrusions include heat stakes configured for heat staking to connect the first portion, the second portion, and the third portion together.

3. The seat assembly of claim 1, wherein the second portion includes a fabric.

4. The seat assembly of claim 1, wherein the back panel includes a fourth portion; and the fourth portion includes the plurality of external support members; and the plurality of external support members are configured to support one or more external objects.

5. The seat assembly of claim 4, wherein the plurality of external support members are spaced apart from the second portion defining a space; and wherein the space is configured to receive portions of said one or more external objects to facilitate detachably connecting said one or more external objects to the seat assembly.

6. The seat assembly of claim 4, wherein the first portion, the third portion, and the fourth portion comprise one or more plastic materials.

7. The seat assembly of claim 4, wherein the first portion and the fourth portion are integrally formed; and the third portion is formed separately from the first portion, the second portion, and the fourth portion.

8. The seat assembly of claim 7, wherein the second portion comprises vinyl.

9. A seat assembly, comprising:

a seat base; and a seat back connected to the seat base, the seat back including a back panel having a plurality of external support members disposed in a grid configuration;

wherein the back panel includes a first portion, a second portion, a third portion, and a fourth portion;

the third portion connects the second portion to the first portion;

the fourth portion includes the plurality of external support members;

the plurality of external support members are configured to support one or more external objects;

the plurality of external support members are spaced apart from the second portion defining a space;

the space is configured to receive portions of said one or more external objects to facilitate detachably connecting said one or more external objects to the seat assembly; and the second portion is configured to cover apertures of the fourth portion to hide internal portions of the seat assembly.

10. A seat assembly, comprising:

a seat base; and a seat back connected to the seat base, the seat back including a back panel having a plurality of external support members disposed in a grid configuration;

wherein the back panel includes a first portion, a second portion, and a third portion;

the first portion, the second portion, and the third portion include different materials; and the third portion is configured to protect the second portion during heat staking of protrusions of the first portion.

11. A method of assembling the seat assembly of claim 10, comprising:

providing the first portion, the second portion, the third portion, and a fourth portion of the back panel;

wherein providing the first portion and the fourth portion includes integrally forming the first portion with the fourth portion; and the fourth portion includes the plurality of external support members.

12. The method of claim 11, including:

disposing the second portion in contact with an inner side of the first portion; and disposing the third portion in contact with an inner side of the second portion.

13. The method of claim 12, wherein disposing the third portion in contact with the inner side of the second portion includes disposing the third portion such that (i) a plurality of protrusions of the first portion are disposed within a plurality of holes of the third portion and (ii) the second portion is disposed at least partially between the first portion and the third portion.

14. The method of claim 13, including:

heat staking the plurality of protrusions of the first portion to connect the first portion, the second portion, and the third portion such that the second portion covers apertures of the fourth portion.

15. The method of claim 14, wherein the third portion protects the second portion during heat staking.

16. The method of claim 11, wherein providing the fourth portion includes forming the external support members; and the grid configuration includes a rectangular grid configuration.

17. The seat assembly of claim 10, wherein the second portion comprises vinyl.

18. The seat assembly of claim 10, wherein the back panel includes a fourth portion that includes the plurality of external support members and is integrally formed with the first portion.

19. The seat assembly of claim 18, wherein the third portion is formed separately from the first portion, the second portion, and the fourth portion.

20. The seat assembly of claim 10, wherein the first portion includes a protrusion that extends through a hole of the third portion.

* * * * *